US009661016B2

(12) United States Patent
Khuti et al.

(10) Patent No.: US 9,661,016 B2
(45) Date of Patent: May 23, 2017

(54) DATA CENTER INFRASTRUCTURE MANAGEMENT SYSTEM INCORPORATING SECURITY FOR MANAGED INFRASTRUCTURE DEVICES

(71) Applicant: AVOCENT HUNTSVILLE CORP., Huntsville, AL (US)

(72) Inventors: Bharat A. Khuti, Huntsville, AL (US); Steven Geffin, Miami, FL (US); James Robinson, Parkland, FL (US); Mario Costa, Davie, FL (US)

(*) Notice: Subject to any disclaimer, the term of this patent is extended or adjusted under 35 U.S.C. 154(b) by 272 days.

(21) Appl. No.: 14/363,197

(22) PCT Filed: Nov. 20, 2012

(86) PCT No.: PCT/US2012/066072
§ 371 (c)(1),
(2) Date: Jun. 5, 2014

(87) PCT Pub. No.: WO2013/085717
PCT Pub. Date: Jun. 13, 2013

(65) Prior Publication Data
US 2014/0366139 A1  Dec. 11, 2014

Related U.S. Application Data

(60) Provisional application No. 61/567,400, filed on Dec. 6, 2011.

(51) Int. Cl.
*H04L 29/06* (2006.01)
*G06F 21/55* (2013.01)
(Continued)

(52) U.S. Cl.
CPC .......... *H04L 63/145* (2013.01); *G06F 21/552* (2013.01); *G06F 21/577* (2013.01);
(Continued)

(58) Field of Classification Search
CPC ... H04L 63/02; H04L 63/0209; H04L 63/105; H04L 63/20; H04L 63/14; H04L 63/1416;
(Continued)

(56) References Cited

U.S. PATENT DOCUMENTS 7,127,743 B1 * 10/2006 Khanolkar ............ G06F 21/552
709/223
9,047,441 B2 * 6/2015 Xie ........................ G06F 21/00
(Continued)

FOREIGN PATENT DOCUMENTS

KR  10-0794136 B1  1/2008
WO  2007016478 A2  2/2007

OTHER PUBLICATIONS

International Search Report and Written Opinion for PCT/US2012/066072, mailed Feb. 28, 2013; ISA/KR.
(Continued)

*Primary Examiner* — Amir Mehrmanesh
(74) *Attorney, Agent, or Firm* — Harness, Dickey & Pierce, P.L.C.

(57) ABSTRACT

A system is disclosed for enhancing detection of a security threat to a managed infrastructure device operating within a data center. The system may have a data center infrastructure management (DCIM) system for monitoring operation of the managed infrastructure device. The DCIM system may include a remote access appliance for communicating with the managed infrastructure device. The managed infrastructure device may include an on-board computer. The remote access appliance may include an engine configured to detect if information to be communicated to the on-board computer poses a security threat to the managed infrastructure device.

16 Claims, 3 Drawing Sheets

(51) Int. Cl.
  *G06F 21/57* (2013.01)
  *G06F 11/30* (2006.01)

(52) U.S. Cl.
  CPC ...... *G06F 11/3006* (2013.01); *G06F 11/3062* (2013.01); *G06F 11/3072* (2013.01)

(58) Field of Classification Search
  CPC ............. H04L 63/1425; H04L 63/1433; H04L 63/145; H04L 67/12; G06F 21/55; G06F 21/552; G06F 21/577; G06F 11/2294; G06F 11/3006; G06F 11/3062; G06F 11/3072
  See application file for complete search history.

(56) References Cited

U.S. PATENT DOCUMENTS

| | | | |
|---|---|---|---|
| 2005/0235352 A1* | 10/2005 | Staats | ................... H04L 41/082 726/14 |
| 2006/0031934 A1 | 2/2006 | Kriegel | |
| 2006/0053491 A1 | 3/2006 | Khuti et al. | |
| 2007/0058657 A1 | 3/2007 | Holt et al. | |
| 2007/0206630 A1 | 9/2007 | Bird | |
| 2007/0261112 A1* | 11/2007 | Todd | ..................... G06F 21/577 726/11 |
| 2008/0295173 A1* | 11/2008 | Tsvetanov | ........... H04L 63/1425 726/23 |
| 2009/0260074 A1 | 10/2009 | De Spiegeleer | |
| 2009/0297043 A1 | 12/2009 | Hinton et al. | |
| 2009/0307705 A1 | 12/2009 | Bogner | |
| 2010/0071024 A1* | 3/2010 | Eyada | ................. H04L 63/0263 726/1 |
| 2010/0268818 A1* | 10/2010 | Richmond | ............ G06F 21/552 709/224 |
| 2011/0288692 A1 | 11/2011 | Scott | |

OTHER PUBLICATIONS

EPO Extended Search Report for corresponding European Patent Application No. 12856500.9 issued Jun. 25, 2015, 8 pages.
Anonymous: "Nmap—Wikipedia, the free encyclopedia", Nov. 16, 2011, pp. 1-8, XP055191660, Retrieved from the Internet: URL:http://en.wikipedia.org/w/index.php?title=Nmap&oldid=460873458 [retrieved on May 26, 2015].
Office Action issued Mar. 30, 2016 in corresponding Chinese Application No. 201280059885.1, 20 pages.
Chinese SIPO Search Report dated Mar. 21, 2016 in corresponding Chinese Application No. 201280059885.1, 5 pages.

* cited by examiner

DATA CENTER INFRASTRUCTURE MANAGEMENT SYSTEM INCORPORATING SECURITY FOR MANAGED INFRASTRUCTURE DEVICES

REFERENCE TO RELATED APPLICATIONS

The present application claims priority to U.S. Provisional Application Ser. No. 61/567,400, filed Dec. 6, 2011, which is incorporated by reference herein.

TECHNICAL FIELD

The present application is directed to systems and methods for managing the infrastructure associated with data centers. More particularly, the present application is directed to systems and methods that provide real time security monitoring of managed infrastructure devices such as computer controlled computer room air conditioning (CRAC) systems, computer controlled power distribution subsystems (PDUs), and other managed infrastructure components that support data center devices such as servers, switches, routers, etc. The real time security monitoring enables viruses, malware, and misuse to be detected, quarantined and/or removed to thus reduce the security risks affecting the managed infrastructure devices, which could potentially negatively impact the operation of a data center.

BACKGROUND

This section provides background information related to the present disclosure which is not necessarily prior art.

Modern data centers typically include a number of managed infrastructure devices that are used to provide cooling and power to the various servers, routers, switches and other data center components. Such managed infrastructure devices may include computer room air conditioning (CRAC) units, power distribution units (PDUs) and other devices. Many of the managed infrastructure devices have progressed in sophistication to the point where they each include their own on-board computer or processor. The computer or processor may communicate the operational status of the device and may be controlled by an independent subsystem. The independent subsystem may be used to control operation of the CRAC units and PDUs, for example by shutting down a CRAC unit to save costs during periods where usage of the data center devices (i.e., servers, routers, etc.) is low. In some instances the independent subsystem may be part of an overall data center infrastructure management (DCIM) system that manages all the data center devices such as servers, routers, processors, and network switches, and also enables remote access to the data center devices from remote terminals.

However, with the ability to communicate with the computers of various managed infrastructure devices such as CRAC units and PDUs comes the potential for security issues as well. A virus infected file or malware which infects an on-board computer of a CRAC unit, a PDU or any other managed infrastructure device, can potentially disrupt operation of the device, as well as potentially impact operation of other devices in the data center such as servers, PDUs, routers, etc. Having a virus or malware infect even just one CRAC unit could potentially result in the need to shut down an entire equipment row of servers. In some large scale data centers, this could involve shutting down dozens or even hundreds of servers. As such, it will be apparent that there is a strong need to be able to perform real time security scans on CRAC units, PDUs and other important managed infrastructure devices. Ideally, the real time security scans would operate to detect security threats, to provide security notifications to IT personnel, and to quarantine or remove potential security threats that could affect the operation of highly important data center infrastructure devices.

SUMMARY

In one aspect the present disclosure relates to a system for enhancing detection of a security threat to a managed infrastructure device operating within a data center. The system may include a data center infrastructure management (DCIM) system for monitoring operation of the managed infrastructure device. The DCIM system may include a remote access appliance for communicating with the managed infrastructure device. The managed infrastructure device may include an on-board computer. The remote access appliance may include an engine configured to detect if information to be communicated to the on-board computer of the managed infrastructure device poses a security threat to the managed infrastructure device.

In another aspect the present disclosure relates to a system for enhancing detection of a security threat to managed infrastructure devices operating within a data center. The system may include a data center infrastructure management (DCIM) system for monitoring operation of the managed infrastructure devices in the data center. The DCIM system may include a remote access appliance for communicating with the managed infrastructure devices, where each of the managed infrastructure devices includes an on-board computer. The remote access appliance may include a plurality of: a complex event processor (CEP) engine configured to be used for log collection for information relating to security threats; a discovery engine that includes at least one of custom definitions or algorithms that enable scanning for a security threat and identifying a security weakness in any one of the managed infrastructure devices; and a security detection engine configured to scan for and detect at least one of malware, or infected files, or infected folders, or infected processes associated with operation of any one of the managed infrastructure devices.

In still another aspect the present disclosure relates to a method for enhancing detection of a security threat to a managed infrastructure device operating within a data center. The method may include using a data center infrastructure management (DCIM) system to monitor operation of a managed infrastructure device in the data center. Using the DCIM system may include using a remote access appliance configured as part of the DCIM system for communicating with an on-board computer of the managed infrastructure device. Using the remote access appliance may include using an engine having machine executable code adapted to run on a processor, to detect if information to be communicated to the on-board computer poses a security threat to the managed infrastructure device.

BRIEF DESCRIPTION OF DRAWINGS

The drawings described herein are for illustrative purposes only of selected embodiments and not all possible implementations, and are not intended to limit the scope of the present disclosure. In the drawings.

Corresponding reference numerals indicate corresponding parts throughout the several views of the drawings.

DETAILED DESCRIPTION

Figure 1:
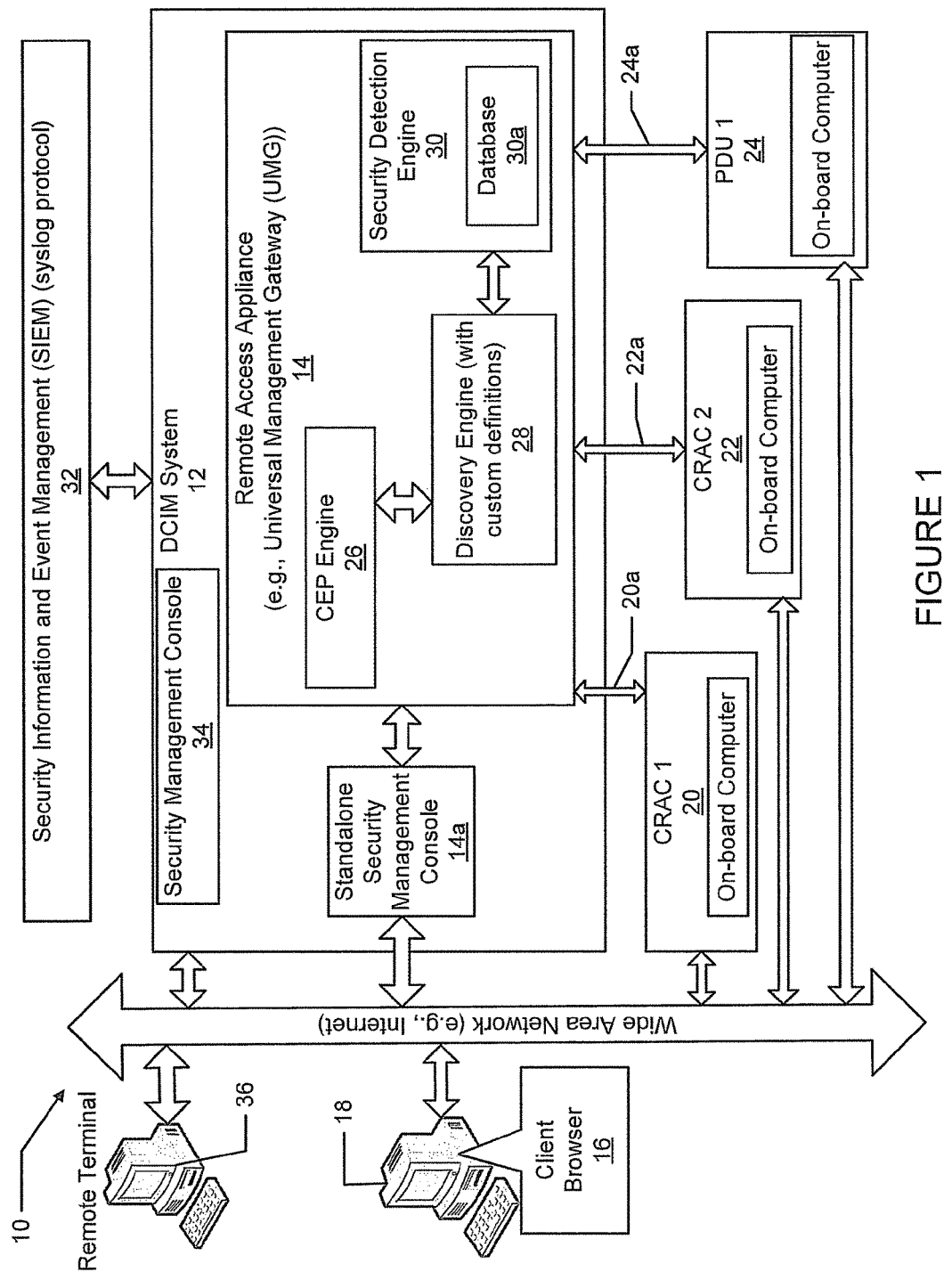
FIG. 1 is a high level block diagram of one embodiment of a system in accordance with the present disclosure in which a DCIM system comprises a remote access appliance having a plurality of modules or engines for detecting security threats that might potentially affect the operation of managed infrastructure devices such as CRAC units, PDUs and other devices used in a data center.

Referring to FIG. 1, one example of an implementation of a system 10 in accordance with the present disclosure is shown. The system 10 may include a data center infrastructure management (DCIM) system which is identified by reference number 12. The DCIM system 12 includes a remote access appliance 14, which in one embodiment may be a "Universal Management Gateway" ("UMG"), commercially available from Avocent Corp. of Huntsville, Ala. However, it will be appreciated that any form of remote access appliance may potentially be used as the remote access appliance. Merely for convenience, the remote access appliance will be referred to throughout the following discussion as the "UMG 14". The UMG 14 may be in communication over a wide area network (WAN) or possibly a local area network (LAN) with a client browser 16 of a remote computer 18 (e.g., desktop, laptop, tablet or possibly a smartphone). The UMG 14 may be in communication with a plurality of managed infrastructure devices 20, 22 and 24 via IP (Internet Protocol) connections 20a, 22a and 24a, or possibly via serial connections. If IP connections are used, then the Liebert Corp. "Velocity" protocol may be implemented. Alternatively, the Modbus protocol, or any other suitable protocol, may also be used to communicate with the managed infrastructure devices 20, 22 and 24. While only three managed infrastructure devices 20-24 are shown, it will be appreciated that a greater or lesser quantity of such devices may be present. Still further, the UMG, while shown as part of the DCIM system 12, may be operated in a standalone mode (i.e., without being a part of the DCIM system 12).

Typically a modern, large scale data center may employ dozens, or even hundreds or thousands, of different types of managed infrastructure devices. The managed infrastructure devices may include computer controlled CRAC (computer room air conditioning) units, PDUs (power distribution units), and various other components that each have an on-board computer that communicates with the UMG 14. In some instances a managed device may include a specific form of on-board computer known more commonly as a "service processor", that assists with monitoring important operational parameters (e.g., voltages, fan speeds, main processor utilization) associated with a managed device. Since the on-board computer of each of the managed infrastructure devices 20-24 is in communication with a computer network, whether directly or through the UMG 14, the managed infrastructure devices are potentially susceptible to viruses, malware and other security threats. A virus that infects an on-board computer or processor of one of the managed infrastructure devices 20-24 could potentially adversely affect operation of one or more critical computing devices, such as one or more servers, routers, network switches, etc. If a CRAC unit is affected, then potentially a significant subsection of a data center, such as the servers in an entire row of equipment racks, could potentially be rendered inoperable. If more than one CRAC unit is affected with a virus or malware, then the possibility may exist that an entire data center could be affected. Accordingly, it will be appreciated that maintaining the managed infrastructure devices 20-24 free from security threats is an important consideration in managing a data center.

Referring further to FIG. 1, the UMG 14 may include a standalone security management console 14a in communication with one or more security engines or modules, each incorporating machine readable code executable on a processor, to accomplish security monitoring of the managed infrastructure devices 20-24. One such engine is a complex event processor (CEP) engine 26. Another security engine may comprise a discovery engine 28, and still another engine may comprise a security detection engine 30. The standalone security management console 14a enables the user to have direct access to data collected by the UMG 14 and control over the UMG 14.

Figure 2:
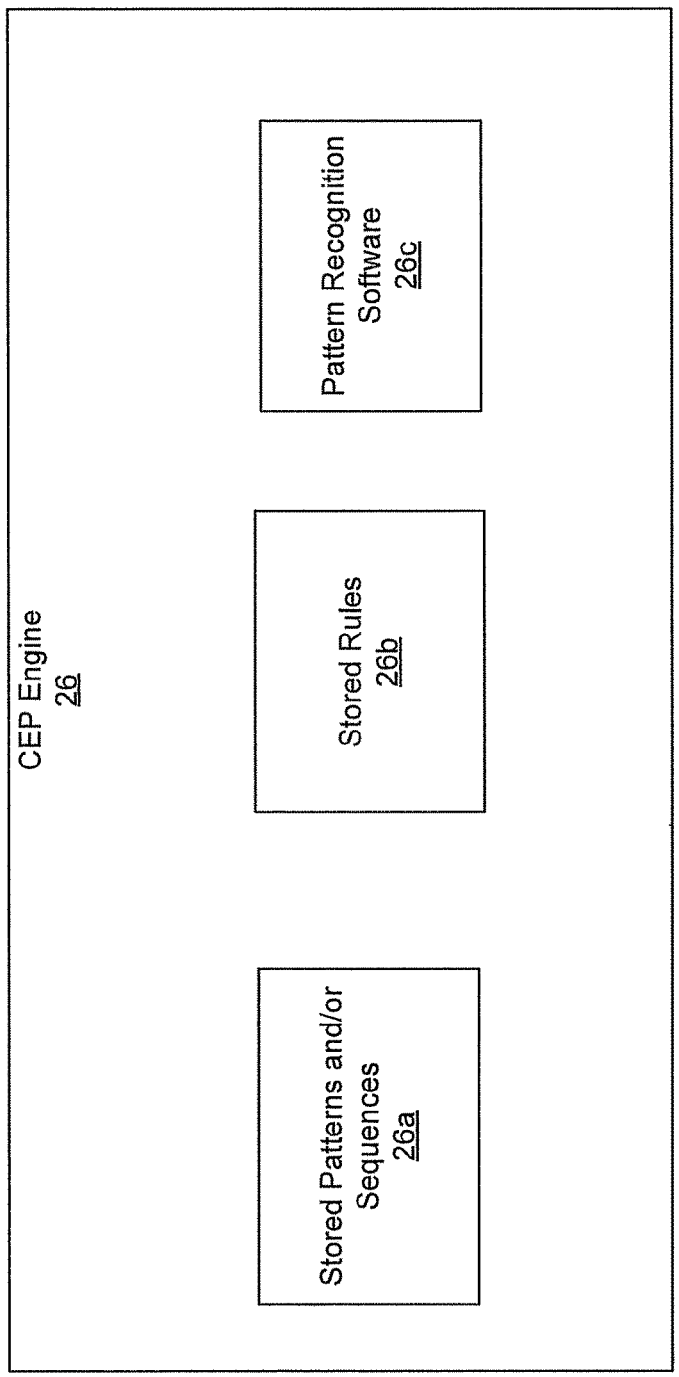
FIG. 2 is a high level block diagram of various components that the CEP engine of FIG. 1 may include.

One example of the CEP engine 26 is shown in FIG. 2 and may be used for log collection and correlation of stored patterns or sequences 26a that enable it to detect if information about to be sent to a managed infrastructure device 20-24 may be infected with a virus. The CEP engine 26 may also include stored, predetermined rules 26b that enable it to evaluate information received by it from one of the managed infrastructure devices 20-24, and which allow it to detect if an abnormal operating condition has affected a given one of the managed infrastructure devices 20-24. The CEP engine 26 may also include suitable pattern recognition software 26c that detects when CPU utilization or power consumption of a managed infrastructure device has changed beyond acceptable predetermined limits, thus possibly indicating that a virus or malware has affected the device's on-board computer or processor.

With further reference to FIG. 1, a discovery engine 28 may be employed with custom definitions or algorithms that enable it to scan for security threats and to identify security weaknesses in the managed infrastructure devices 20-24. One such discovery engine may include an OEM or open source vulnerability scanner like Nmap ("Network Mapper"), which is an open source utility for network exploration or security auditing. The discovery engine 28 may also be able to scan specific network addresses to determine if a specific device has outdated software, or if a port has a common weakness like an SMB (Microsoft Server Message Block) or other network protocol vulnerability. The discovery engine 28 may also identify whether a specific port of a managed infrastructure device is open when it otherwise should not be, thus possibly indicating that a security threat has arisen with the device.

Referring further to FIG. 1, the security detection engine 30 may be used to scan for and detect malware or infected files, folders or processes associated with operation of any of the managed infrastructure devices 20-24. The security detection engine 30 could also be configured to prevent the downloading of potentially unsafe files from known malware URLs. The security detection engine 30 may also identify and protect a given client's proprietary files or otherwise provide a notification that a proprietary file of a client has been moved or copied. The security detection engine 30 may include its own database 30a or it may access a remote data base via a WAN (e.g., the Internet) or possibly via a LAN. The security detection engine 30 may be an open source security engine such as OpenDLP, which is an agent-based, centrally-managed, distributable data loss prevention (DLP) tool. Alternatively, OEM DLP tools available from various manufacturers such as Websense of San Diego, Calif., Symantec Corporation of Mountain View, Calif. and RSA (the security division of EMC) of Bedford, Mass. could be implemented. The security detection engine 30 may also set safer configuration settings on devices like CRAC units, PDUs and other data center management systems, thus reducing the risk to the customer.

The security detection engine 30 may also be provided with the ability to scan all of the various types of managed infrastructure devices used in a data center. Alternatively, a plurality of different security detection engines 30 may be employed, with each one customized to handle a specific one of the managed infrastructure devices 20-24 (or possibly a specific class/type/model of managed infrastructure device). It is also possible for one, two or more of the engines 26, 28 or 30 to be assigned to a specific one of the managed infrastructure devices 20-24, in the event that operation of the specific managed infrastructure device is critical.

While it is anticipated that in most applications the engines 26, 28 and 30 may be independent modules (including software and potentially hardware components), it is possible that one or more of the engines 26-30 may be integrated into another event/alarm monitoring subsystem (not shown) of the DCIM system 12, or at least placed in communication with the other event/alarm monitoring subsystem. If any of the engines 26-30 are placed in communication with the other event/alarm monitoring subsystem, then the other event/alarm monitoring subsystem's generating and/or reporting capabilities could potentially be used to apprise other applications being used with the DCIM system 12 of security threats. It may also be advantageous to incorporate files, for example virus signature files, into the other event/alarm monitoring subsystem in the event it is being used to communicate with a managed infrastructure device.

Referring further to FIG. 1, a Security Information and Event Management (SIEM) (using, as one example, the syslog protocol) server 32 (hereinafter "SIEM server 32") may also be in communication with the DCIM system 12 via a LAN connection or a WAN connection. It will be appreciated that other protocols besides the syslog protocol could just as readily be used with the SIEM server 32. The SIEM server 32 may collect data (typically log files; e.g., event logs) into a central repository for trend analysis. SIEM products generally comprise software agents (i.e., components) that may be running on the SIEM server 32. The SIEM products may collect information about security related events and may display reports, charts and graphs of collected information. Such collection may be performed in real time. The SIEM products may incorporate local filters to reduce and manipulate the data that is collected and logged by the SIEM server 32. The data that is collected by the SIEM server 32 may be correlated, analyzed, and/or normalized, and/or aggregated as it is being recorded by the SIEM products running on the SIEM server 32. The SIEM server 32 could be open source software or software available from various OEM companies such as NitroSecurity, Inc. (now part of McAfee, Inc.) of Portsmouth, N.H., or ArcSight, L.L.C. (now part of Hewlett-Packard Company) of Cupertino, Calif., or Symantec Corp.

Referring further to FIG. 1, a security management console 34 may also form part of the DCIM system 12. The security management console 34 may be accessed via a LAN connection or via a WAN connection to enable an IT security individual to set policies, monitor and review security events, and initialize or schedule a scan of the managed infrastructure devices. The security management console 34 may be used to look for security threats, set policies on alarm triggers and notifications, enable SIEM integration, and configure and manage a deployment of one or multiple engines 26, 28 and 30 on one or multiple UMGs 14 from a remote terminal 36.

Figure 3:
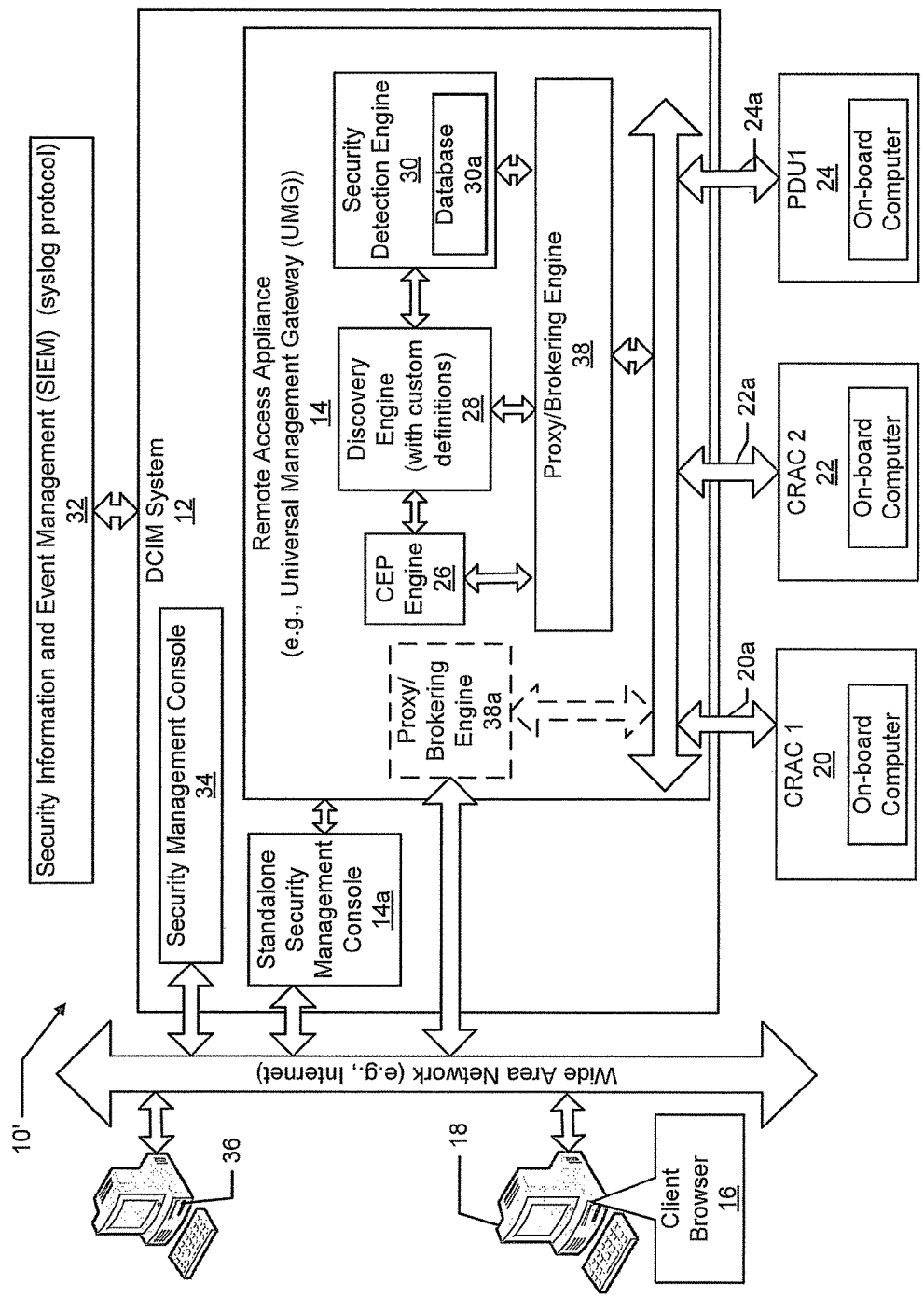
FIG. 3 is a high level block diagram of another embodiment of the present disclosure, which is similar to FIG. 1, but which incorporates a proxy/brokering engine for controlling communications between the managed infrastructure devices and the remote access appliance.

In another embodiment 10' shown in FIG. 3 the DCIM system 12 is modified to also include a proxy/brokering engine 38. The proxy/brokering engine 38 effectively operates as a "connection" broker and allows safe and secure access to managed infrastructure devices like the CRAC units 20 and 22 and the PDU 24. The proxy/brokering engine 38 further may act as a mediator to the managed infrastructure devices 20-24 by inspecting the communications with the managed infrastructure devices. The proxy/brokering engine 38 may allow only safe and authorized communications outside of the DCIM system 12 or when the UMG 14 is operating in standalone mode. FIG. 3 also illustrates an optional implementation of a proxy/brokering engine 38a that allows a remote terminal to directly access the managed infrastructure devices 20, 24 and 26.

The system 10 may make a significant difference in ensuring that viruses, malware and other security threats do not affect the on-going operation of a data center by attacking and compromising one or more managed infrastructure devices operating within the data center. The system 10 enables prompt reporting of security threats or viruses, and also provides real-time scanning, detection and quarantining/removal of security threats that might otherwise be transmitted to the on-board computer or processor of a managed infrastructure device. The system 10 is also able to detect when files have been copied or moved and to provide alerts as to these events.

Furthermore, it will be appreciated that while the system 10 has been described in connection with managed infrastructure devices operating within a data center, the system 10 could be implemented in other environments with little or no modification. Other environments may potentially include factories and manufacturing facilities, warehousing facilities, health care facilities, military and government facilities, and virtually any other type of facility where the operation of a plurality of computer-controlled devices needs to be monitored to ensure against viruses, malware and other security threats that may compromise operation of the computer-controlled devices.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for enhancing detection of at least one of malware or viruses attempting to infect a managed infrastructure device operating within a data center, the system including:
  a data center infrastructure management (DCIM) system for monitoring operation of the managed infrastructure device, the DCIM system including:
    a remote access appliance for communicating with the managed infrastructure device, the managed infrastructure device including an on-board computer, wherein the remote access appliance including an engine configured to detect if information to be communicated to the on-board computer of the managed infrastructure device is a security threat to the managed infrastructure device, and also whether information received from the managed infrastructure device poses a security threat to the managed infrastructure device;

wherein the engine comprises a complex event processor (CEP) engine:

having a plurality of predetermined rules that enable evaluating information received from the managed infrastructure device and to detect if an abnormal operating condition has affected the managed infrastructure device;

wherein the CEP engine is configured to be used for log collection and correlation of pre-stored patterns or sequences that enable the CEP engine to detect if the information about to be sent to the managed infrastructure device is infected with a security threat; and wherein the CEP engine includes pattern recognition software that detects when at least one of central processing unit (CPU) utilization or power consumption of the managed infrastructure device has changed beyond an acceptable predetermined limit, thus potentially indicating that a virus or malware has affected the on-board computer of the managed infrastructure device.

2. The system of claim 1, wherein the CEP engine comprises a discovery engine that includes at least one of custom definitions or algorithms that enable it to scan for security threats and to identify a security weakness in the managed infrastructure device.

3. The system of claim 1, wherein the CEP engine comprises a security detection engine configured to scan for and detect at least one of malware, or infected files, or infected folders, or infected processes associated with operation of the managed infrastructure device.

4. The system of claim 1, wherein the CEP engine comprises a security detection engine configured to at least one of:

prevent a downloading of potentially unsafe files from known malware URLs;

identify and protect a given client's proprietary files; and provide a notification that a proprietary file of a client has been moved or copied.

5. The system of claim 1, wherein the remote access appliance is in communication with a security management console configured to be accessed via at least one of a local area network connection or a wide area network connection, and wherein the security management console enables an individual to perform at least one of the following operations:

to set policies for operation of the managed infrastructure device;

to monitor and review security events that affect the managed infrastructure device;

to initialize or schedule a scan of the managed infrastructure device to look for security threats;

to set policies on alarm triggers and notifications relating to the managed infrastructure device; and to configure and manage a deployment of the CEP engine.

6. The system of claim 1, further comprising a Security Information and Event Management (SIEM) server in communication with the DCIM system by at least one of a local area network connection or a wide area network connection, the SIEM server configured to collect data into a central repository for trend analysis.

7. The system of claim 6, wherein the SIEM server includes a software component configured to collect information about security-related events and to display at least one of reports, charts and graphs of collected information concerning the security-related events.

8. A system for enhancing detection of a security threat that affects operation of managed infrastructure devices operating within a data center, the system including:

a data center infrastructure management (DCIM) system for monitoring operation of the managed infrastructure devices, the DCIM system including:

a remote access appliance for communicating with the managed infrastructure devices, each of the managed infrastructure devices including an on-board computer; and the remote access appliance including a plurality of:

a complex event processor (CEP) engine configured to be used for log collection of information relating to security threats;

a discovery engine that includes at least one of custom definitions or algorithms that enable it to scan for security threats and to identify a security weakness in any one of the managed infrastructure devices; and a security detection engine configured to scan for and detect at least one of malware, or infected files, or infected folders, or infected processes associated with operation of any one of the managed infrastructure devices, and also for information received from any one of the managed infrastructure devices to determine if the information is indicative of a security threat;

wherein the CEP engine includes:

a plurality of predetermined rules that enable evaluating information received from the managed infrastructure devices and to detect if an abnormal operating condition has affected any one of the managed infrastructure devices;

wherein the CEP engine is configured to be used for log collection and correlation of pre-stored patterns or sequences that enable the CEP engine to detect if the information about to be sent to any one of the managed infrastructure devices is infected with a security threat; and wherein the CEP engine includes pattern recognition software that detects when at least one of central processing unit (CPU) utilization or power consumption of any one of the managed infrastructure devices has changed beyond an acceptable predetermined limit, thus potentially indicating that a virus or malware has affected the on-board computer of one or more of the managed infrastructure devices.

9. The system of claim 8, wherein the discovery engine includes code executable on a processor that includes at least one of custom definitions or algorithms that enable it to scan for security threats and to identify a security weakness in any one of the managed infrastructure devices.

10. The system of claim 8, wherein the security detection engine includes code executable on a processor which is configured to scan for and detect at least one of malware, or infected files, or infected folders, or infected processes associated with operation of any one of the managed infrastructure devices.

11. The system of claim 8, further comprising a Security Information and Event Management (SIEM) server in communication with the DCIM system by at least one of a local area network connection or a wide area network connection, the SIEM server configured to collect data into a central repository for trend analysis.

12. The system of claim 11, wherein the SIEM server includes a software component configured to collect information about security-related events and to display at least one of reports, charts and graphs of collected information concerning the security-related events.

13. The system of claim 8, further comprising a proxy/brokering engine configured to act as a mediator between the engines and the managed infrastructure devices to allow safe and secure access to the managed infrastructure devices by inspecting communications with the managed infrastructure devices.

14. A method for enhancing detection of a security threat to a managed infrastructure device operating within a data center, the method including:
 using a data center infrastructure management (DCIM) system to monitor operation of a managed infrastructure device in the data center;
 using a remote access appliance, which forms a portion of the DCIM system, to communicate with an on-board computer of the managed infrastructure device; and
 using an engine disposed within the remote access appliance, and where the engine has machine executable code adapted to run on a processor, to detect if information to be communicated to the on-board computer of the managed infrastructure device represents a security threat, and also whether information received from the managed infrastructure device, the information including one of power utilization or processor utilization of the managed infrastructure device, poses a security threat to the managed infrastructure device;
 wherein using an engine comprises using a complex event processor (CEP) engine:
  having a plurality of predetermined rules that enable evaluating information received from the managed infrastructure device and to detect if an abnormal operating condition has affected the managed infrastructure device;
  configured to be used for log collection and correlation of pre-stored patterns or sequences that enable the CEP engine to detect if the information about to be sent to the managed infrastructure device is infected with a security threat; and
  that makes use of pattern recognition software that detects when at least one of central processing unit (CPU) utilization or power consumption of the managed infrastructure device has changed beyond an acceptable predetermined limit, thus potentially indicating that a virus or malware has affected the on-board computer of the managed infrastructure device.

15. The method of claim 14, wherein using the CEP engine further comprises using at least one of:
 a discovery engine having at least one of custom definitions or algorithms, to scan for security threats and to identify a security weakness in the managed infrastructure device; and
 a security detection engine to scan for and detect at least one of malware, or infected files, or infected folders, or infected processes associated with operation of the managed infrastructure device.

16. A remote access appliance configured for use in a data center to monitor operation of a managed infrastructure device within the data center, and for enhancing detection of at least one of malware or viruses attempting to infect the managed infrastructure device, and wherein the remote access appliance is configured to communicate with the managed infrastructure device, and wherein the managed infrastructure device has an on-board computer, the remote access appliance including:
 an engine configured to receive information about to be sent to the managed infrastructure device, and information received back from the managed infrastructure device wherein
 the engine configured to analyze the information to determine if the information poses a security threat to the on-board computer of the managed infrastructure device;
 wherein the engine comprises a complex event processor (CEP) engine:
  having a plurality of predetermined rules that enable evaluating information received from the managed infrastructure device and to detect if an abnormal operating condition has affected the managed infrastructure device;
  wherein the CEP engine is configured to be used for log collection and correlation of pre-stored patterns or sequences that enable the CEP engine to detect if the information about to be sent to the managed infrastructure device is infected with a security threat; and
  wherein the CEP engine includes pattern recognition software that detects when at least one of central processing unit (CPU) utilization or power consumption of the managed infrastructure device has changed beyond an acceptable predetermined limit, thus potentially indicating that a virus or malware has affected the on-board computer of the managed infrastructure device.

* * * * *